Aug. 2, 1949.   C. E. SMITH   2,477,946
VOLTAGE REGULATOR CIRCUITS
Filed April 13, 1944   2 Sheets-Sheet 1

Inventor
CLYDE E. SMITH
By Francis J. Klempay
Attorney

Inventor
CLYDE E. SMITH

Patented Aug. 2, 1949

2,477,946

UNITED STATES PATENT OFFICE 2,477,946

VOLTAGE REGULATOR CIRCUITS

Clyde E. Smith, Warren, Ohio, assignor to The Taylor-Winfield Corporation, Warren, Ohio, a corporation of Ohio Application April 13, 1944, Serial No. 530,776

5 Claims. (Cl. 320—1)

This invention relates to voltage regulating circuits and more particularly to simplified and improved circuit arrangements for controlling the output voltage of a rectifier. The primary object of the invention is the provision of a voltage regulating system controlling the output voltage of a rectifier which is operative, within the energy delivering limits of the current source and the rectifier, to maintain a predetermined potential in the direct current supply line leading from the rectifier irrespective of variations in the potential of the source.

Another and more specific object of the invention is the provision, in an electrical system, of an improved arrangement for controlling the voltage on a capacitance being charged through a rectifier from an alternating current source wherein the ultimate or peak potential attained by the capacitance is maintained within narrow limits irrespective of normal variations in the peak potential of the source.

The above objects are accomplished, generally, by the use of a grid-controlled rectifier and by providing a suitable grid-biasing circuit therefor in which the effective biasing potential results from a component variable in accordance with the voltage of the output circuit and from an alternating component having a predetermined phase-delayed relation with respect to the voltage of the source, the arrangement being such that within the regulatory phase of the control, conduction in the rectifier is initiated and controlled in accordance with the instantaneous values of the source potential on the rising or falling portions of the voltage waves of the source. Inasmuch as variations in the peak value of an alternating voltage wave of predetermined fixed frequency do not alter the basic nature of the wave or change appreciably the instantaneous voltages lying outside proportionately minor degree ranges which have as their media points of peak positive and negative potential material variations in peak voltage do not appreciably vary the voltage magnitudes at the preselected control points lying outside these ranges. I have found, for example, that if the alternating component of the grid biasing potential is delayed or phased back 150° relative to the anode-cathode potential a control can be attained in which only approximately .01% change in the output voltage of the rectifier results from a full 20% change in the source voltage either in a decreased or an increased direction.

The above and other specific objects and advantages of the invention will become apparent upon consideration of the following detailed specification and the accompanying drawing wherein there is disclosed certain preferred embodiments of the invention.

Figure 1:
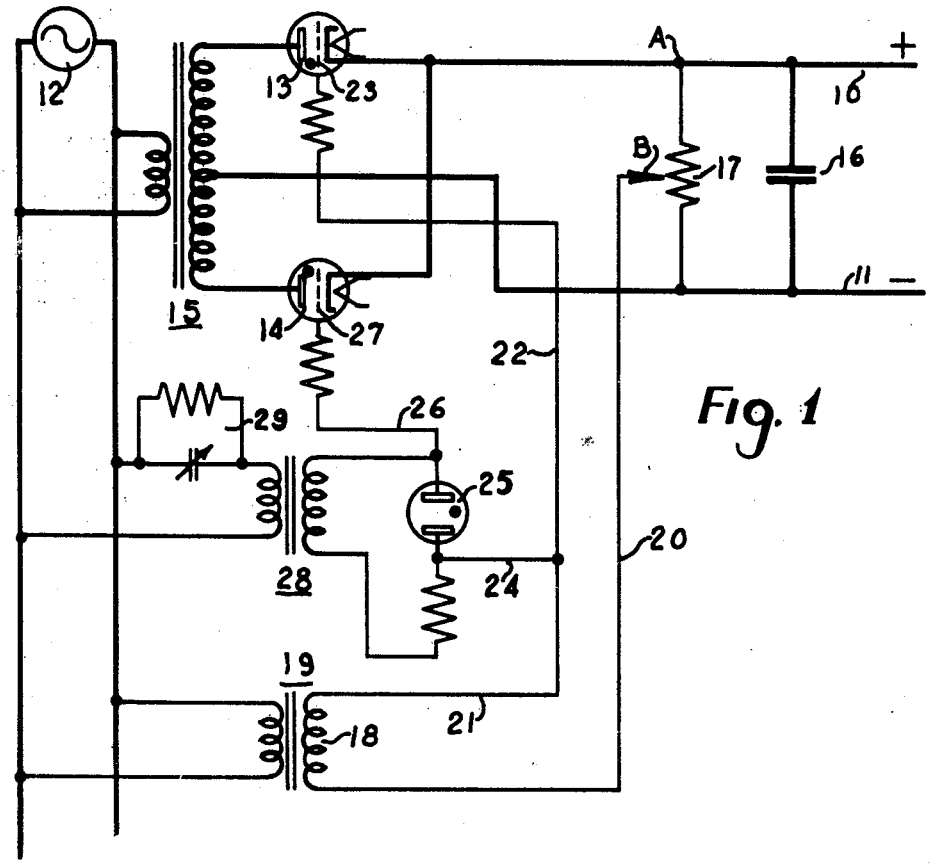
Figure 1 is a schematic showing of a controlled rectifier constructed in accordance with the principles of the invention.

Referring to Figure 1, a direct current load circuit comprising the conductors 10 and 11 is arranged to be energized from an alternating current source 12 by means of a rectifier comprising discharge devices 13 and 14 which draw their current from the source 12 through a transformer 15. Discharge devices 13 and 14 are shown as being of the grid-controlled type and as having an ionizable medium although it should be obvious, as the description proceeds, that the principles of the invention are equally applicable in rectifier systems employing other types of discharge devices such as, for example, those having pool cathodes and ignition electrodes together with auxiliary ignition or starting tubes and in this case such auxiliary tubes would be controlled similarly to tubes 13 and 14 in the illustrated embodiment.

The direct current supply circuit 10, 11 may be provided with a capacitance 16 and other ancillary elements such as smoothing reactors and current limiting resistors, not shown. Connected across the supply line 10, 11 is a potentiometer 17 having one of its terminals connected to conductor 10 at A and having an adjustable tap B. Point A is connected with the cathodes of the tubes 13 and 14 and the A to B portion of the potentiometer 17 is in the control grid circuit of the tubes 13 and 14, the circuit including also the secondary winding 18 of a grid biasing transformer 19 having its primary winding connected to the source 12. The control grid circuit for tube 13 may be traced from the cathode thereof through conductor 10, portion A-B of potentiometer 17, conductor 20, secondary 18, and conductors 21 and 22 to the control grid 23 of the tube. A similar circuit may be traced for tube 14 but from conductor 21 this circuit proceeds through a conductor 24, a voltage regulating tube 25, and conductor 26 to the grid resistor and grid 27 of the tube.

The voltage supplied by the transformer 19 is in phase with the anode-cathode voltage applied to the discharge devices 13 and 14. As stated above, discharge device 25 is of the kind which maintains a predetermined voltage drop across its electrodes irrespective of the undulating character of its current source. Tube 25 is arranged to be periodically energized by energy derived from the source 12 through a peaking transformer 28 the primary of which is connected to the source through a phase shifting circuit 29 which is preferably so designed or adjusted that the output wave of the transformer 28 is phased back well beyond the quarter cycle point of the voltage wave of the source but within the half cycle point thereof. For reasons which will be explained more fully hereinafter it is only necessary that the circuit 29 operate in such manner that the output peak of the transformer 28 be timed to occur before or after the peak source voltage point a sufficient interval that substantially wide variations in the magnitude of the peak source voltage has little effect on the instantaneous voltage of the source at the time the delayed (or advanced) impulses occur. I have found that for purposes of this invention and particularly for the specifically illustrated application of the invention that a delay of approximately 150° will produce the desired accuracy of result.

The periodic potential developed across tube 25 is of such polarity that it is additive, insofar as the rectifier 14 is concerned, in a positive direction with respect to the grid to the biasing potential furnished by the direct component A—B and by the alternating component of the transformer 19. Thus in the regulatory phase of the operation of the rectifier the total energy translated by tube 14 is modulated by the resultant potential derived from the direct component which is responsive to the voltage of the supply line 10, 11, the uniform drop across tube 25, and the instantaneous value of the voltage of the output of transformer 19 at the point in the wave at which tube 25 is energized. Since this instantaneous value is but a portion of the resultant and does not vary appreciably with wide variations in the peak voltage of the source, a close regulation of the potential developed in the supply circuit 10, 11 may be attained. A better understanding of the theory of operation of the circuit of Figure 1 may be obtained from the curves of Figure 2.

Figure 2:
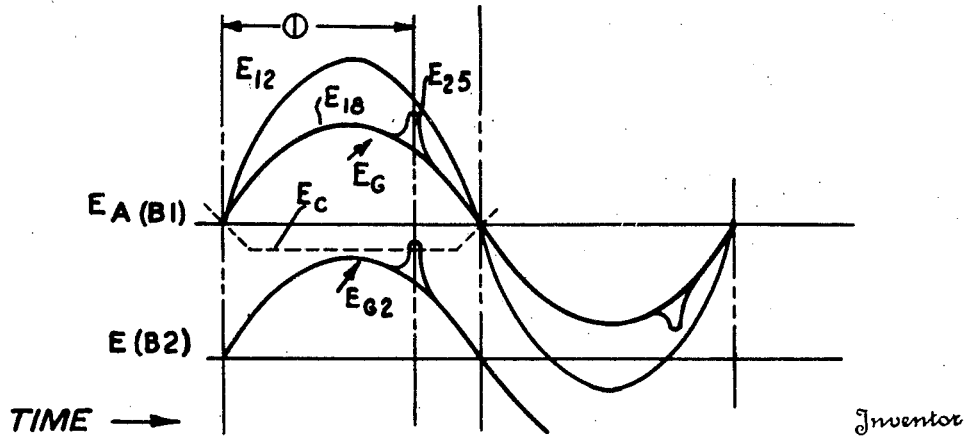
Figure 2 is a set of characteristic curves illustrating the theory of operation of the circuit of Figure 1.

In Figure 2 the curve $E_{12}$ represents the potential of the source 12 while $E_c$ represents the critical grid potential curve for the tube 14. $E_{A(B1)}$ represents the potential of the tap B at the start of the operation of the rectifier when no voltage appears in the supply line 10, 11 or across the capacitance 16. $E_{b2}$ is the potential of the tap at the time sufficient voltage is developed across the line that the regulatory phase of the system and specifically of the circuit 24—27 becomes active. Composite curve $E_g$ representing the base potential $E_{18}$ furnished by the transformer 19 and the superimposed peak $E_{25}$ represents the control grid potential furnished the tube 14 at the start of the rectifier operation while a corresponding composite curve $E_{g2}$ represents the grid potential after the operation has entered its regulatory phase. It should be now apparent that beginning with the potential in the supply line 10, 11 far depressed both the tubes 13 and 14 will be rendered conductive for substantially the whole of their respective half cycles and as the increase in the potential of the load continues resulting in the continuing lowering of the potential of the tap B with respect to point A and the cathodes of the rectifiers the rectifiers will transmit progressively less of the energy contained in the respective half cycles. As the operation continues to the point where the peak voltages supplied by the transformer 19 are outbalanced by the negative potential developed across the potentiometer 17 from A to B the tube 13 will remain extinguished and the peak voltage from the transformer 19 will likewise lose its control over the operation of tube 14 after which the control of such tube is effected by the delayed impulse furnished the circuit by the tube 25. As illustrated, impulse $E_{25}$ occurs at a time when the anode-cathode voltage on this tube is falling so that the energy modulation affects only a small portion of the total energy contained in the half cycles positive with respect to the tube. While it is also possible to effect a comparable mode of operation by timing the impulses $E_{25}$ to occur on a rising portion of the wave it is believed that a more precise and uniform control is attained with the impulse phased as illustrated. Also a greater precision of control is attained by utilizing but one of the rectifiers during the regulatory phase of the operation of the system. It should be clearly understood however, that, if desired, both the rectifiers illustrated and additional rectifiers, if utilized, may be controlled in the manner shown for tube 14. In Figure 1 this may be readily accomplished by connecting conductor 22 with conductor 26 rather than directly with conductor 21 as illustrated.

Figure 3:
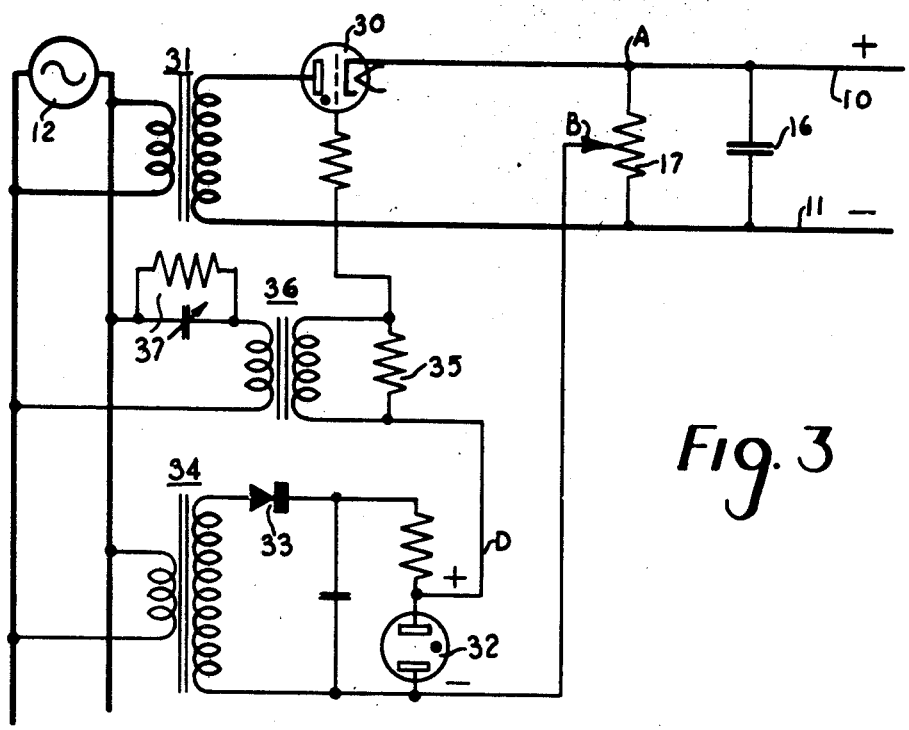
Figure 3 is a schematic representation of a modified controlled rectifier circuit constructed in accordance with the principles of the invention.
Figure 4:
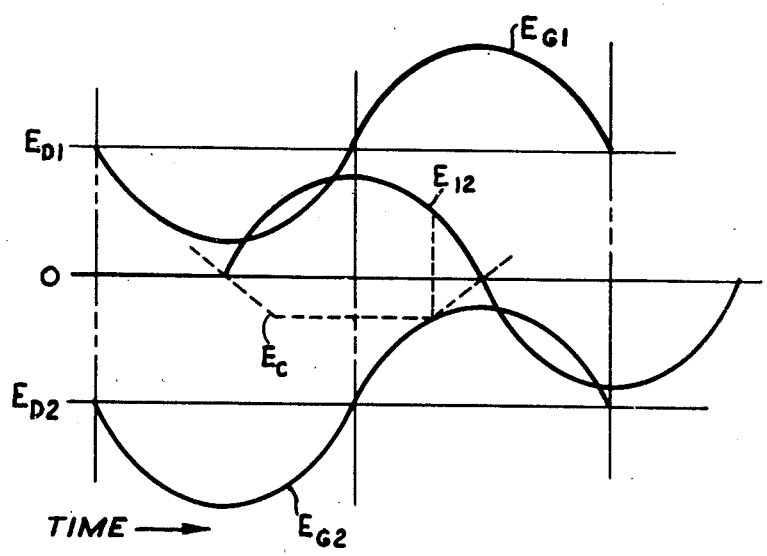
Figure 4 is a set of curves illustrating the theory of operation of the circuit of Figure 3.

In Figures 3 and 4 there is illustrated an application of the principles of the invention to the maintenance of a predetermined potential in a direct current supply circuit in which the periodic impulses superimposed on the biasing wave in the embodiment of Figure 1 is dispensed with while comparable results are attained by phasing back the principal biasing wave itself. In Figure 3 a rectifier 30 having in addition to its principal electrodes a control member and being preferably of the type having an ionizable medium is shown as supplying direct current to the line 10, 11 from a transformer 31 which has its primary connected to the source 12. In this system, as in the system of Figure 1, the grid-controlled tube 30 may be replaced with discharge devices of other types including those employing pool cathodes and ignition electrodes as will be understood and, in addition, the output circuit of the rectifier may be provided with a smoothing reactor and other desired ancillary devices. Interposed in the control circuit for the rectifier tube 30 is a source of constant positive potential to insure full half wave operation of the rectifier when the potential of the direct current supply line is far depressed. This source may comprise a discharge device 32 of the voltage regulating type which is arranged to be energized in phase with the anode-cathode potential applied to tube 30 by means of a rectifier 33 deriving energy from the source 12 through a transformer 34. Also interposed in series in the control circuit for the rectifier tube 30 is a resistance 35 connected across the secondary of the transformer 36 the primary of which is connected to the source 12 through a phase shifting circuit 37. For reasons pointed out hereinafter circuit 37 is designed or adjusted to shift the output of transformer 36 either roughly 90° in a forward direction or 270° lagging direction but it should be clearly understood that this extent is exemplary only as considerable latitude in the range of adjustment will yet permit the operation of the system in accordance with the principles of the invention. The prime consideration of the adjustment or extent of phase deviation is the attainment of the critical grid voltage by the potential furnished by the transformer 36 at a time which occurs both well beyond and well in advance of the peak potentials of the source and of the biasing wave furnished by transformer 36 in order that variations in the peak potential of the source will have minimum effect on the control.

The operation of the system of Figure 3 will be better understood upon consideration of the curves of Figure 4 in which $E_{12}$ represents the anode-cathode voltage impressed on the tube 30 and $E_c$ the critical grid potential of this tube. $E_{d1}$ represents the potential in conductor D with respect to the cathode of tube 30 at the start of conduction in tube 30 or when no potential appears across the conductors 10, 11, the positive value of this potential $E_{d1}$ resulting from the potential across the tube 32. $E_{d2}$ represents the potential in conductor D relative to the cathode of tube 30 at the time the potential across the conductors 10, 11 approaches the value for which the regulator is adjusted or in other words when the regulatory phase of the operation of the system comes into effective being. Thus, curve $E_{g1}$ represents the potential applied to the control grid of the tube 30 at the start of the energizing cycle while the curve $E_{g2}$ represents the grid potential as a charge on the capacitance approaches its proper value.

It should be clear from Figure 4 that at the start of operation of the rectifier the tube 30 will conduct for the whole of the positive half cycles of the voltage wave. As potential is built up in the direct current supply line and across the capacitance 16 potential D becomes progressively more negative by reason of the increase in the drop from A to B so that the negative loop of the potential developed across resistance 35 by the output of transformer 36 intersects the critical grid characteristic curve $E_c$ further delayed from the start of the positive half cycle of the voltage $E_{12}$ so that less energy contained in each of the successive positive half cycles will be transmitted to the load. It should be observed that at the final approach of the direct current load circuit to its desired potential the total resultant grid potential furnished the tube 30 reaches the critical grid potential therefor at a time well in advance of the time of peak potential developed across resistance 35. Thus, the control of the operation of the rectifier 30 is primarily in response to the potential drop across the A to B portion of potentiometer 17 which is connected across the capacitor 16 and the direct current supply line and is substantially independent of variations in the peak voltage of source 12. This is true because the phase relation between the anode-cathode voltage and the grid potential furnished by the transformer 36 is such that the potential on the control grid always reaches its critical value well in advance of the peak positive potential point of the voltage wave furnished by the transformer 36. As explained above variations in the magnitude of the peak voltage have progressively less effect on the magnitude of the instantaneous voltages in the voltage wave on either side of the point of maximum voltage as the zero line is approached. Therefore if the grid biasing wave is phased back sufficiently to insure that the critical grid voltage is always reached well in advance of the point of maximum potential, all as clearly evident from Figure 4, variations in the value of the maximum potential will have but a minor effect on the control of the rectifier.

It should now be apparent that I have provided improved and simplified circuit arrangements for controlling the operation of a rectifier which accomplishes the objects initially set out. Although but few and readily connected physical elements are required, circuits constructed in accordance with the principles of the invention are operative to automatically maintain preselected potentials in direct current supply lines substantially independent of variations in the peak values of the alternating source potential. This result is brought about primarily by shifting the phase of the control biasing wave or periodic impulses either in an advancing or a retarding direction whereby the critical control points of the wave or impulses always occur outside the time intervals of maximum source potential of the principal biasing wave.

The above specifically described embodiments of the invention should be considered as illustrative only as obviously many changes may be made therein without departing from the spirit or scope of the invention. Reference should therefore be had to the appended claims in determining the scope of the invention.

What I claim is:

1. In an electrical system having a grid-controlled electric discharge device to charge a capacitance from an alternating current source, means to control the potential to which said capacitance is charged comprising means to establish a first potential proportionate to the potential across said capacitance, means to provide an alternating potential substantially in phase with the voltage of said source, means to furnish a potential impulse of equal periodicity with the voltage of said source but timed to occur substantially outside the range of peak potentials of said source; and a circuit connected to the control grid of said device to impress thereon a control potential which is the resultant of said first potential, said alternating potential and said periodic impulses; the potentials of said impulses being additive to said alternating potential.

2. A system according to claim 1 further characterized in that said means to furnish comprises a constant potential device and an energizing circuit for energizing said device periodically.

3. A system according to claim 1 further characterized in that said means to furnish comprises an induction device, means to energize said induction device from said source comprising a phase shifting circuit, and a discharge device of the voltage regulating type adapted to be energized by said induction device; said last mentioned discharge device being connected in series in said first mentioned circuit.

4. In an electrical system having grid-controlled electric discharge means to charge a capacitance from an alternating current source the combination of means to establish a first potential proportionate to the potential across said capacitance, means to provide a periodic potential of equal periodicity with the voltage of said source but timed to occur during periods of decreasing voltage of said source, and a control circuit connected to the control grid of said first mentioned means to impress thereon a control potential which is the resultant of said first potential and said periodic potential.

5. In an electrical system having a plurality of grid-controlled electric discharge devices to charge a capacitance from an alternating current source, means to establish a first potential proportionate to the potential across said capacitance, means to provide an alternating potential substantially in phase with said source, a circuit connected to the control grids of said devices to impress thereon a controlled potential which is the resultant of said first potential and said alternating potential, means to furnish a potential impulse of equal periodicity with the voltage of said source but timed to occur substantially outside the timed periods of peak potentials of said source, and means to apply the potentials of said impulses to the control grid of one of said discharge devices.

CLYDE E. SMITH.

REFERENCES CITED

The following references are of record in the file of this patent:

UNITED STATES PATENTS

| Number | Name | Date |
|---|---|---|
| 1,986,627 | Edwards et al. | Jan. 1, 1935 |
| 2,020,314 | Howe | Nov. 12, 1935 |
| 2,068,351 | Rockwood | Jan. 19, 1937 |
| 2,164,792 | Winograd | July 4, 1939 |
| 2,190,514 | Garman | Feb. 13, 1940 |
| 2,229,448 | Garman | Jan. 21, 1941 |
| 2,239,289 | Goodhue et al. | Apr. 22, 1941 |
| 2,250,102 | Klemperer | July 22, 1941 |
| 2,295,293 | Rogers | Sept. 8, 1942 |